United States Patent
Oda et al.

(10) Patent No.: US 8,722,765 B2
(45) Date of Patent: May 13, 2014

(54) ALUMINA PARTICLE COMPOSITE, METHOD OF MANUFACTURING THE ALUMINA PARTICLE COMPOSITE, RESIN COMPOSITION AND METHOD OF MANUFACTURING THE RESIN COMPOSITION

(75) Inventors: Takashi Oda, Yokosuka (JP); Yasuaki Kai, Yokohama (JP); Tomohiro Ito, Yokohama (JP); Takashi Seino, Yokosuka (JP); Hironobu Muramatsu, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 13/469,302

(22) Filed: May 11, 2012

(65) Prior Publication Data

US 2012/0289653 A1    Nov. 15, 2012

Related U.S. Application Data

(62) Division of application No. 11/220,402, filed on Sep. 7, 2005, now abandoned.

(30) Foreign Application Priority Data

| Sep. 7, 2004 | (JP) | 2004-259933 |
| Dec. 14, 2004 | (JP) | 2004-361599 |
| Feb. 4, 2005 | (JP) | 2005-029168 |

(51) Int. Cl.
- *C08K 9/10* (2006.01)
- *C08K 3/18* (2006.01)
- *C01F 7/02* (2006.01)

(52) U.S. Cl.
USPC ............... 523/210; 524/430; 423/625

(58) Field of Classification Search
USPC ............... 523/210; 524/430; 423/625
See application file for complete search history.

(56) References Cited

U.S. PATENT DOCUMENTS

| 2,915,475 A | 12/1959 | Bugosh |
| 4,076,638 A | 2/1978 | Redmore et al. |
| 4,115,485 A | 9/1978 | Genessi |
| 4,126,650 A | 11/1978 | Via et al. |
| 4,183,843 A | 1/1980 | Koenig et al. |
| 4,233,184 A | 11/1980 | Cull |
| 4,258,142 A | 3/1981 | Ohzeki et al. |
| 4,420,341 A | 12/1983 | Ferrigno |
| 4,492,682 A | 1/1985 | Trebillon |
| 4,629,618 A | 12/1986 | Oguri et al. |
| 4,629,717 A | 12/1986 | Chao |
| 4,650,783 A | 3/1987 | Chao et al. |
| 4,716,029 A | 12/1987 | Oguri et al. |
| 4,960,749 A | 10/1990 | Miura et al. |
| 4,994,429 A | 2/1991 | Wieserman et al. |
| 5,001,204 A | 3/1991 | Klendworth et al. |
| 5,306,680 A | 4/1994 | Fukuda |
| 5,397,391 A | 3/1995 | Stramel |
| 5,576,389 A | 11/1996 | Ueno et al. |
| 5,759,213 A | 6/1998 | Adair et al. |
| 5,837,049 A | 11/1998 | Watson et al. |
| 6,005,043 A * | 12/1999 | Zhu ............... 524/493 |
| 6,015,456 A | 1/2000 | Fukuda et al. |
| 6,159,441 A | 12/2000 | Mohri et al. |
| 6,197,277 B1 | 3/2001 | Fukuda et al. |
| 6,218,454 B1 | 4/2001 | Nosu et al. |
| 6,440,552 B1 | 8/2002 | Kajihara et al. |
| 6,838,005 B2 | 1/2005 | Tepper et al. |
| 6,846,435 B1 | 1/2005 | Bohnen et al. |
| 6,887,517 B1 | 5/2005 | Cook et al. |
| 7,189,775 B2 | 3/2007 | Tang et al. |
| 7,476,440 B2 | 1/2009 | Oda et al. |
| 7,531,161 B2 | 5/2009 | Tang et al. |
| RE43,468 E | 6/2012 | Oda et al. |
| 2002/0147261 A1 | 10/2002 | Warth et al. |
| 2003/0043586 A1 | 3/2003 | Sagal et al. |
| 2003/0060572 A1 | 3/2003 | Causa et al. |
| 2003/0148042 A1* | 8/2003 | Wang ............... 427/601 |
| 2003/0193037 A1* | 10/2003 | Koyanagi et al. ............... 252/1 |
| 2003/0197300 A1 | 10/2003 | Tang et al. |
| 2004/0173121 A1 | 9/2004 | Fukuo et al. |
| 2006/0047045 A1* | 3/2006 | Oda et al. ............... 524/430 |
| 2006/0058426 A1 | 3/2006 | Oda et al. |
| 2006/0234102 A1 | 10/2006 | Nakato et al. |
| 2006/0289411 A1 | 12/2006 | Chang et al. |
| 2006/0289841 A1 | 12/2006 | Ito et al. |
| 2008/0031808 A1 | 2/2008 | Bauer et al. |
| 2009/0326097 A1 | 12/2009 | Fujita et al. |
| 2010/0210777 A1 | 8/2010 | Oda et al. |
| 2010/0256270 A1 | 10/2010 | Souma et al. |

FOREIGN PATENT DOCUMENTS

| EP | 0 707 051 A1 | 4/1996 |
| EP | 1 428 860 A1 | 6/2004 |
| JP | 57-168954 A | 10/1982 |
| JP | 05-098083 A | 4/1993 |
| JP | 07-102112 A | 4/1995 |
| JP | 07-047644 B2 | 5/1995 |
| JP | 08-073723 A | 3/1996 |
| JP | 2519045 B2 | 5/1996 |
| JP | 08-333115 A | 12/1996 |
| JP | 10-030039 A | 2/1998 |

(Continued)

OTHER PUBLICATIONS

HPH 2000/4-DH5 DataSheet pp. 1-2, Ika-Warke GmbH & Co, no publication date given.*
T. Oda U.S. PTO Office Action, U.S. Appl. No. 11/220,402 dated Sep. 1, 2009, 29 pgs.

(Continued)

*Primary Examiner* — Alexander Kollias
(74) *Attorney, Agent, or Firm* — Foley & Lardner LLP

(57) ABSTRACT

An alumina particle composite (1) includes an alumina particle (2) and an organic acid (3) chemically bonded to a surface of the alumina particle (2). Further, the alumina particle (2) has a short axis length of 1 to 10 nm, a long axis length of 20 to 400 nm, and an aspect ratio of 5 to 80, and is represented by Formula I, $$Al_2O_3 \cdot nH_2O \qquad \text{Formula I}$$

where n is 0 or more.

13 Claims, 5 Drawing Sheets

(56) References Cited

FOREIGN PATENT DOCUMENTS

| | | | |
|---|---|---|---|
| JP | 10-070022 | A | 3/1998 |
| JP | 11-310643 | A | 11/1999 |
| JP | 11-343349 | A | 12/1999 |
| JP | 2000-053871 | A | 2/2000 |
| JP | 2000-239014 | A | 9/2000 |
| JP | 2001-261976 | A | 9/2001 |
| JP | 2003-054941 | A | 2/2003 |
| JP | 2004-051390 | A | 2/2004 |
| JP | 2004-149687 | A | 5/2004 |
| JP | 2006-056739 | A | 3/2006 |
| JP | 2006-062905 | A | 3/2006 |
| WO | WO-98/57612 | A1 | 12/1998 |
| WO | WO-01/03824 | A1 | 1/2001 |
| WO | WO-2004/037721 | A | 5/2004 |
| WO | WO 2008/016048 | A1 | 2/2008 |
| WO | WO 2009/011278 | A1 | 1/2009 |

OTHER PUBLICATIONS

T. Oda U.S. PTO Final Office Action, U.S. Appl. No. 11/220,402 dated Mar. 9, 2010, 11 pgs.

T. Oda U.S. PTO Examiner's Answer, U.S. Appl. No. 11/220,402 dated Jan. 4, 2011, 30 pgs.

Gary A. Nitowski, "Topographic and Surface Chemical Aspects of the Adhesion of Structural Epoxy Resins to Phosphorus Oxo Acid Treated Aluminum Adherends," Dissertation submitted to the Faculty of the Virginia Polytechnic Institute and State University, 1998, pp. 1-213, cover sheet, abstract and table of contents.

Hideyuki et al., "Study on the surface characteristics of inorganic oxide powder of a monbutyl phosphoric ester by using a photentionmeter tiration," Journal of Adhesion Society of Japan, vol. 39, No. 7, 2003, pp. 248-254.

M. Higo et al., "Characterization of Metal Oxide Surfaces and Thin Semiconductor Films by Inelastic Electron Tunneling Spectroscopy," Analytical Sciences, vol. 18, Mar. 2002, pp. 227-242.

M.K. Templeton et al., "Decomposition of Phosphonate Esters Adsorbed on Aluminum Oxide," J. Am. Chem. Soc., vol. 107, 1985, pp. 774-779.

R. Coast et al., "A vibrational spectroscopic comparison of vinyltriethoxysilane and vinylphosphonic acid adsorbed on oxidized aluminum," J. Adhesion Sci. Technol., vol. 10, No. 2, (1996), pp. 101-121.

R.D. Ramsier et al., "Adsorption of Phosphorus Acids on Alumina," Surface Science, vol. 203 (1988), pp. 72-88.

SASOL Product Information, pp. 1-2.

T. Ito, U.S. PTO Office Action, U.S. Appl. No. 11/471,731 dated Mar. 19, 2008, 5 pgs.

T. Ito, U.S. PTO Office Action, U.S. Appl. No. 11/471,731 dated Jun. 9, 2008, 15 pgs.

T. Ito, U.S. PTO Office Action, U.S. Appl. No. 11/471,731 dated Nov. 14, 2008, 14 pgs.

T. Oda et al., US PTO Office Action, U.S. Appl. No. 11/220,402, dated May 14, 2008, 9 pgs.

T. Oda et al., US PTO Office Action, U.S. Appl. No. 11/220,402, dated Jul. 13, 2008, 17 pgs.

T. Oda et al., US PTO Office Action, U.S. Appl. No. 11/220,402, dated Jan. 13, 2009, 18 pgs.

T. Oda U.S. PTO Office Action, U.S. Appl. No. 12/621,060 dated Nov. 18, 2010, 8 pgs.

T. Oda U.S. PTO Office Action, U.S. Appl. No. 12/768,378 dated Feb. 2, 2011, 27 pgs.

T. Oda, U.S. PTO Notice of Allowance, U.S. Appl. No. 11/200,049 dated Sep. 25, 2008, 7 pgs.

T. Oda, U.S. PTO Office Action U.S. Appl. No. 11/200,049 dated Mar. 20, 2008, 9 pgs.

T. Oda, U.S. PTO Office Action, U.S. Appl. No. 11/200,049 dated Jan. 18, 2008, 6 pgs.

T. Sugimoto, "Monodispersed Particles," Elsevier Science B.V., 2001, pp. 193, 225, 270-289.

F. Billmeyer, Jr., "Textbook of polymer Science, 3$^{rd}$ Edition", *John Wiley & Sons, Inc.*, 1984, pp. 417-418.

\* cited by examiner

FIG. 8

| | RESIN | FILLED PARTICLE | BLENDED AMOUNT (wt%) | ASPECT RATIO OF PARTICLE | TRANSPARENCY OF RESIN COMPOSITION | LIGHT TRANSMITTANCE (%) | BENDING STRENGTH (MPa) | FLEXURAL MODULUS (GPa) | LINEAR EXPANSION COEFFICIENT ($10^{-5}$/°C) |
|---|---|---|---|---|---|---|---|---|---|
| Ex. 8 | PC | Ex. 1 | 8.7 | 20 to 30 | TRANSPARENT | 82 | 120 | 4.5 | 5.8 |
| Ex. 9 | PC | Ex. 2 | 9.1 | 45 to 80 | TRANSPARENT | 75 | 130 | 5.0 | 5.4 |
| Ex. 10 | PC | Ex. 3 | 8.8 | 20 to 30 | TRANSPARENT | 80 | 125 | 4.7 | 5.7 |
| Ex. 11 | PC | Ex. 4 | 8.9 | 45 to 80 | TRANSPARENT | 70 | 130 | 5.2 | 5.4 |
| Ex. 12 | PC | Ex. 5 | 8.5 | 20 to 30 | TRANSPARENT | 45 | 120 | 4.3 | 5.7 |
| Ex. 13 | PC | Ex. 6 | 8.9 | 20 to 30 | TRANSPARENT | 60 | 120 | 4.4 | 5.6 |
| Ex. 14 | PC | Ex. 7 | 8.7 | 20 to 30 | TRANSPARENT | 85 | 130 | 4.8 | 5.4 |
| Ex. 15 | ACRYLIC | Ex. 1 | 9.2 | 20 to 30 | TRANSPARENT | 84 | 118 | 4.3 | 5.5 |
| Ex. 16 | ACRYLIC | Ex. 2 | 9.3 | 45 to 80 | TRANSPARENT | 78 | 125 | 4.5 | 5.4 |
| Ex. 17 | ACRYLIC | Ex. 3 | 9.0 | 20 to 30 | TRANSPARENT | 80 | 120 | 4.1 | 5.6 |
| Ex. 18 | ACRYLIC | Ex. 4 | 9.2 | 45 to 80 | TRANSPARENT | 75 | 125 | 4.6 | 5.4 |
| Ex. 19 | ACRYLIC | Ex. 5 | 9.0 | 20 to 30 | TRANSPARENT | 50 | 120 | 4.0 | 5.8 |
| Ex. 20 | ACRYLIC | Ex. 6 | 9.1 | 20 to 30 | TRANSPARENT | 60 | 120 | 4.2 | 5.6 |
| Ref. Ex. 1 | PC | - | 0 | - | TRANSPARENT | 85 | 90 | 2.6 | 6.5 |
| Ref. Ex. 2 | ACRYLIC | - | 0 | - | TRANSPARENT | 93 | 110 | 3.2 | 6.0 |

FIG. 9

| | RESIN | FILLED PARTICLE | BLENDED (wt%) | ASPECT RATIO OF PARTICLE | COLOR TONE | LIGHT TRANSMITTANCE (%) | BENDING STRENGTH (MPa) | FLEXURAL MODULUS (GPa) | LINEAR EXPANSION COEFFICIENT ($10^{-5}/°C$) |
|---|---|---|---|---|---|---|---|---|---|
| Comp. Ex. 1 | PC | ALUMINA SOL 520 | 9.4 | 5 to 8 | WHITE/OPAQUE | 0 | 104 | 3.3 | 6.3 |
| Comp. Ex. 2 | PC | ALUMINUM OXIDE C | 10.4 | 1 | WHITE/SLIGHTLY OPAQUE | 5 | 98 | 3.1 | 6.5 |
| Comp. Ex. 3 | PC | CAM9010 | 10.2 | 3 to 7 | LIGHT YELLOW/OPAQUE | 5 | 100 | 3.4 | 6.0 |
| Comp. Ex. 4 | PC | MEK-ST | 10.6 | 1 | WHITE/OPAQUE | 0 | 90 | 2.5 | 6.0 |
| Comp. Ex. 5 | ACRYLIC | ALUMINA SOL 520 | 10.1 | 5 to 8 | WHITE/OPAQUE | 0 | 105 | 3.8 | 5.8 |
| Comp. Ex. 6 | ACRYLIC | ALUMINUM OXIDE C | 9.8 | 1 | WHITE/OPAQUE | 0 | 100 | 3.6 | 5.8 |
| Comp. Ex. 7 | ACRYLIC | CAM9010 | 9.9 | 3 to 7 | YELLOW/OPAQUE | 0 | 115 | 3.8 | 5.7 |
| Comp. Ex. 8 | ACRYLIC | MEK-ST | 9.9 | 1 | WHITE/OPAQUE | 5 | 115 | 3.8 | 5.9 |
| Ref. Ex. 1 | PC | - | 0 | - | TRANSPARENT | 85 | 90 | 2.6 | 6.5 |
| Ref. Ex. 2 | ACRYLIC | - | 0 | - | TRANSPARENT | 93 | 110 | 3.2 | 6.0 |

ALUMINA PARTICLE COMPOSITE, METHOD OF MANUFACTURING THE ALUMINA PARTICLE COMPOSITE, RESIN COMPOSITION AND METHOD OF MANUFACTURING THE RESIN COMPOSITION

This application is a divisional application of U.S. application Ser. No. 11/220,402 filed Sep. 7, 2005, which claims priority to Japanese Application No. 2004-259933, filed Sep. 7, 2004, Japanese Application No. 2004-361599, filed Dec. 14, 2004, and Japanese Application No. 2005-029168, filed Feb. 4, 2005. All of which are hereby incorporated by reference in their entirety.

BACKGROUND OF THE INVENTION

1. Field of the Invention

The present invention relates to an alumina particle composite, a method of manufacturing the alumina particle composite, a resin composition and a method of manufacturing the resin composition.

2. Description of the Related Art

Transparent resin applicable as an alternative of inorganic glass includes acrylic resin, polycarbonate resin, polyester resin, styrene resin, epoxy resin, and the like. Among automotive parts, the resin glass has a feature in being excellent in impact resistance, lightweight properties, and moldability as compared with the inorganic glass. However, for the resin glass to be used as the alternative of the inorganic glass, problems concerning a linear expansion coefficient, rigidity, strength, flame retardancy are inherent in the resin glass under the current technology, and the resin glass cannot meet performance required for the automotive parts from a viewpoint of passenger protection. Therefore, under the current situation, such a transparent resin material for use in an automobile is limited to application to a small part such as a cover for an automotive lamp represented by a headlamp.

In order to make transparency of the resin and an improvement of mechanical strength thereof compatible with each other, a research on organic/inorganic nanocomposite materials becomes one of solving measures therefor. Representative ones of the research on the organic/inorganic nanocomposite materials include: "Composite Material and Manufacturing Method Thereof" (Japanese Patent No. 2519045) by Toyota Central R&D Labs., Inc.; "Polyamide Composite Material and Manufacturing Method Thereof" (Japanese Patent Examined Publication No. H07-47644 (published in 1995)) by Ube Industries, Ltd. and others; "Polyolefin Composite Material and Manufacturing Method Thereof" (Japanese Patent Unexamined Publication No. H10-30039 (published in 1998)) by Showa Denko K.K.; and the like.

In any of the polymer composites as described above, each of which uses filler on a nano-order level, dispersion of the filler in the resin accounts for a large factor on maintaining the transparency of the resin and improving the properties thereof. For the purpose of enhancing dispersibility of the filler, many various dispersion methods in which selection of microparticles, surface treatment of the particles and optimization of composite synthesis are combined are disclosed. For example, Japanese Patent Examined Publication No. H07-47644 discloses a method of immersing caprolactam as a material of nylon between layers of montmorillonite and polymerizing the caprolactam therewith, thereby obtaining a composite of the nylon and the filler. However, though the improvements of the mechanical properties (strength, elastic modulus, surface hardness and thermal resistance) in the obtained composite are recognized in this method, an application of the method is limited because of insufficiencies of the transparency, hygroscopicity and surface hardness of the composite, and application examples thereof are little.

Meanwhile, in order to make the transparency and the improvements of the properties such as the rigidity and the strengths compatible with each other, the applicant of this application has filed a patent application named "Resin-Made Window and Manufacturing Method Thereof" (Japanese Patent Unexamined Publication No. H11-343349 (published in 1999)). This patent application discloses a resin-made window formed of a transparent resin composition in which microsilica having a diameter of a wavelength of visible light or less is blended into a transparent amorphous organic polymer for the purpose of improving the rigidity, and so on.

SUMMARY OF THE INVENTION

The transparent resin composition obtained by the method of Japanese Patent Unexamined Publication No. H11-343349 can improve various properties such as the strength, the elastic modulus and the impact resistance in a state of maintaining the transparency to some extent. However, since an aspect ratio of a silica particle is 1, the various properties described above except the transparency cannot be improved sufficiently, resulting in that it has been impossible to put the transparent resin composition into practical use for the automotive parts.

As described above, though the polymer nanocomposite and the manufacturing method thereof have been studied in various ways, a definitive technology therefor has not been established yet.

The present invention has been created in order to solve the above-described problems. It is an object of the present invention to provide filler improving strength, elastic modulus and impact resistance of resin, and to provide a resin composition having higher transparency, which is excellent in strength, elastic modulus and impact resistance.

The first aspect of the present invention provides an alumina particle composite comprising: an alumina particle; and an organic acid chemically bonded to a surface of the alumina particle.

The second aspect of the present invention provides a method of manufacturing an alumina particle composite comprising: adding an alkali aqueous solution in an aqueous solution with an aluminum salt to produce a reaction mixture containing a gel material of aluminum hydroxide; first heating the reaction mixture at a first temperature not lower than room temperature; after the first heating, second heating the reaction mixture at a second temperature higher than the first temperature; after the second heating, third heating the reaction mixture at a third temperature lower than the second temperature; and after the third heating, fourth heating the reaction mixture at a fourth temperature not less than the room temperature; and dispersing boehmite particles generated in the reaction mixture into a solvent, and adding an organic acid to the solvent.

The third aspect of the present invention provides a resin composition comprising: resin; and an alumina particle composite contained in the resin as a filler, the alumina particle composite comprising: an alumina particle; and an organic acid chemically bonded to a surface of the alumina particle.

The fourth aspect of the present invention provides a method of manufacturing a resin composition comprising: dispersing an alumina particle composite into a first solvent to produce an alumina particle-dispersion liquid; mixing a monomer as a raw material of resin and the alumina particle-dispersion liquid; and polymerizing the monomer in a state where the monomer and the alumina particle-dispersion liquid are mixed together, wherein a method of manufacturing the alumina particle composite comprises: adding an alkali aqueous solution in an aqueous solution with an aluminum salt to produce a reaction mixture containing a gel material of aluminum hydroxide; first heating the reaction mixture at a first temperature not lower than room temperature; after the first heating, second heating the reaction mixture at a second temperature higher than the first temperature; after the second heating, third heating the reaction mixture at a third temperature lower than the second temperature; and after the third heating, fourth heating the reaction mixture at a fourth temperature not less than the room temperature; and dispersing boehmite particles generated in the reaction mixture into a second solvent, and adding an organic acid to the second solvent.

BRIEF DESCRIPTION OF THE DRAWINGS

The invention will now be described with reference to the accompanying drawings wherein;

FIG. 8 is a table showing experiment conditions and evaluation results of resin compositions of Examples; and FIG. 9 is a table showing experiment conditions and evaluation results of resin compositions of Comparative examples.

DETAILED DESCRIPTION OF THE PREFERRED EMBODIMENT

Hereinafter, description will be made of embodiments of the present invention with reference to the drawings.
(Alumina Particle Composite)

Figure 1:
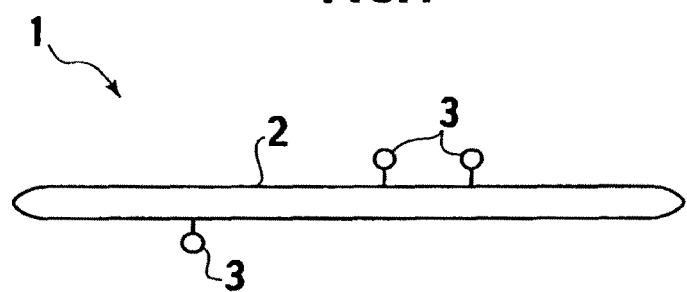
FIG. 1 is a schematic view of an alumina particle composite of the present invention.

An alumina particle composite as filler of the present invention contains an organic acid chemically bonded to alumina particles. Specifically, as shown in FIG. 1, in an alumina particle composite 1 of this application, an organic acid 3 is provided on a surface of an alumina particle 2, and alumina present on a surface layer of the alumina particle 2 and the organic acid 3 are chemically bonded to each other.

As the organic acid 3, usable is a compound containing a sulfonic acid group, a carboxyl group or a hydroxyl group, or a compound having a structure belonging to those of boric acids, phosphoric acids or amino acids. Among them, preferable is the compound containing the sulfonic acid group, which can be strongly bonded to the alumina particles, or the organic acid containing the phosphoric acid or the boric acid which is rich in type and favorably available from the market.

Meanwhile, an inorganic acid is also usable; however, hydrochloric acid, sulfuric acid, nitric acid and the like, each of which has a strong acidity, break a crystalline structure of the particles, and dissolve surfaces of the alumina particles, thereby changing a form of the alumina particles when concentrations thereof are high. Accordingly, it is difficult to adjust the concentrations. Each of inorganic phosphoric acid and carbonic acid has a weak acidity, and bonding power thereof to the alumina particles becomes insufficient. Hence, the organic acids are preferable, and among them, the organic acid containing the sulfonic acid group is more preferable.

These organic acids may be used singly or in combination of two or more thereof. Alkylbenzene sulfonic acid and a sulfonic acid compound to be described below are preferable as the compound containing the sulfonic acid group, however, the compound is not limited to these. As the sulfonic acid compound, mentioned are benzenesulfonic acid, o-toluenesulfonic acid, m-toluenesulfonic acid, p-toluenesulfonic acid, methyl p-toluenesulfonate, sulfonic acids such as ethylbenzenesulfonic acid, propylbenzenesulfonic acid and dodecylbenzenesulfonic acid which can be represented by $CH_3(CH_2)_n CH_2C_6H_4SO_3H$ (n=0-10), trisubstituted dodecyl p-toluenesulfonate, o-nitrobenzenesulfonic acid having a nitro group, m-nitrobenzenesulfonic acid, p-phenolsulfonic acid having an aryl group, naphthalene-2-sulfonic acid, naphtholsulfonic acid, o-aminobenzenesulfonic acid, m-aminobenzenesulfonic acid, p-aminobenzenesulfonic acid, o-cresolsulfonic acid, dimethylbenzenesulfonic acid, 2,4-dimethylbenzenesulfonic acid, 2,4-dinitrobenzenesulfonic acid, poly(2-acrylamido-2-methyl-1-propanesulfonic acid), a copolymer of poly(2-acrylamido-2-methyl-1-propanesulfonic acid) and styrene, a compound in which a sulfonic acid group is bonded to a terminal of a polycarbonate oligomer, and the like.

Moreover, as the boric acids usable in the present invention, mentioned are methylboric acid, phenylboric acid, butylboric acid, isopropylboric acid, 4-chlorophenylboric acid, 4-hydroxyphenylboric acid, 1,4-phenylenebisboric acid, 4-carboxylphenylboric acid, and the like. However, the boric acids are not limited to these.

A mode of chemical bonding of the organic acid 3 to the alumina particle 2 is a covalent bond, a coordinate bond, a hydrogen bond, an electrostatic bond, and the like.

Moreover, a content of the organic acid in the alumina particle composite is not particularly limited as long as a light transmittance of a dispersion liquid of the alumina particles, which is to be used in a polymerization process of a resin composition to be described later, is 40% or more. However, with regard to the content of the organic acid in the alumina particle composite, a blended amount of the organic acid with 1 mol of the alumina particles is preferably 1 mmol or more, more preferably, 10 mmol or more. If the blended amount of the organic acid is less than 1 mmol, it is impossible to obtain a dispersion liquid of the alumina particles in which the alumina particles are dispersed uniformly in an organic solvent. Note that the blended amount of the organic acid can be measured by combining apparatuses for a TG-DTA, an IR, an NMR and the like.

Note that the number of moles of the alumina particles is obtained by a general formula. For example, molecular weights of α alumina particles and γ alumina particles are defined as 101.96 by a general formula $Al_2O_3$. In the case of boehmite particles, a molecular formula AlO(OH) is applied to a calculation of a molecular weight thereof, and the molecular weight is defined as 59.98.

Moreover, in the alumina particle composite 1 of the present invention, it is preferable that the alumina particles 2 be represented by the following General Formula (I).

$$Al_2O_3 \cdot nH_2O \qquad \text{Formula I}$$

When n in the formula is 0, the formula represents an aluminum oxide, which is α and γ alumina, or β, ρ, χ, ε, γ, κ, κ', θ, η, δ and λ alumina. When n in the formula is 1, the formula represents boehmite. Moreover, when n in the formula is more than 1 and less than 3, the formula represents a mixture of boehmite and alumina hydrate with an amorphous structure. This is generally referred to as pseudo boehmite. Furthermore, when n is 3 or more, the formula represents alumina hydrate with an amorphous structure. The alumina particles as the filler is characterized in being at least one selected from these. In particular, the alumina particles preferable as the filler for the resin composition are α alumina, γ alumina and boehmite in terms of stability and easiness in manufacturing.

Figure 2:
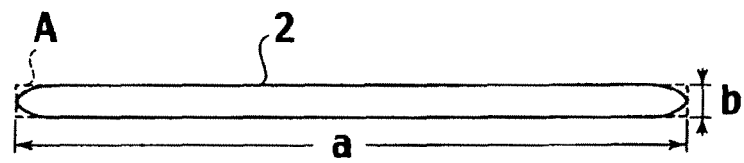
FIG. 2 is a schematic view for explaining a long axis and a short axis.
Figure 3:
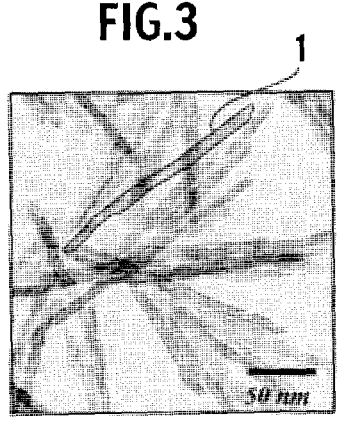
FIG. 3 is an electron microscope photograph of a boehmite particle composite manufactured by Example 1.

A shape of the alumina particles may be any of fiber-like, spindle-like, stick-like, needle-like, tubular and columnar. Moreover, with regard to the particle size, it is preferable that a length of a short axis be within a range from 1 to 10 nm, that a length of a long axis be within a range from 20 to 400 nm, and that an aspect ratio be within a range from 5 to 80. In the case of aiming to obtain a highly transparent resin composition by blending the alumina particles therein, as shown in FIG. 1 and FIG. 3, it is particularly preferable that the particles be needle-like crystals with the length of the short axis being 6 nm or less. Here, as shown in FIG. 2, assuming a rectangle A with the smallest area among rectangles circumscribed to a target particle in a microscope image or the like, the long axis indicates a long side a of the rectangle A, and the short axis indicates a short side b of the above smallest rectangle A. The aspect ratio indicates a value of the long axis length/the short axis length (a/b).

Figure 4:
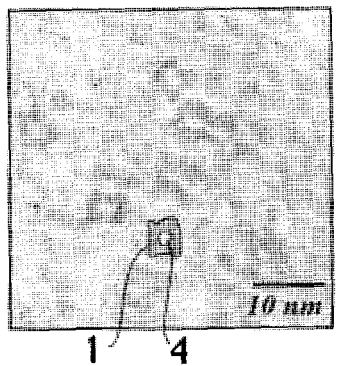
FIG. 4 is an electron microscope photograph of a cross section of the boehmite particle composite manufactured by Example 1.

Moreover, as shown in FIG. 4, preferably, each alumina particle 2 includes a cylindrical hollow 4 therein. As for the size of the hollow 4, preferably, the diameter thereof is within a range from 0.5 to 9.5 nm according to the short axis length of the particles 2, and the length thereof is within a range from 5 to 400 nm, which is not more than the long axis length of the particles. This can reduce the specific gravity of the alumina particles 2. Accordingly, when the alumina particles 2 are contained as the filler in the resin, while the weight of the obtained resin composition is being maintained at a comparatively lightweight, the mechanical strength of the obtained resin composition can be increased, and the high transparency thereof can be achieved. However, in the alumina particles 2, the hollow 4 inside is not an essential element. In other words, the alumina particles 2 can achieve the object of the present invention without the hollow 4.

(Alumina Particle Manufacturing Method)

Next, a description is given of a method of manufacturing the alumina particles. First, the description is given of a method of manufacturing the boehmite particles (alumina particle 2) with n=1 in the aforementioned general formula I.

<Production of Reaction Mixture>

In manufacturing the boehmite, first, an alkaline aqueous solution is added to an aluminum salt aqueous solution to prepare a gel material of aluminum hydroxide.

The aluminum salt constituting the aluminum salt aqueous solution is at least an aluminum salt selected from aluminum chloride anhydride, aluminum chloride hexahydrate, aluminum bromide, aluminum bromide hexahydrate, aluminum iodide, aluminum nitrate nonahydrate, aluminum lactate, aluminum sodium sulfate dodecahydrate (sodium alum), aluminum perchlorate nonahydrate, aluminum isopropoxide, aluminum s-butoxide, aluminum t-butoxide, and the like. Among these, aluminum chloride hexahydrate, aluminum nitrate nonahydrate, aluminum bromide hexahydrate, aluminum sodium sulfate dodecahydrate, and aluminum isopropoxide are preferred, which are easily available on the market, easy to use, and cheap.

The alkaline aqueous solution is added to an action system to promote hydrolysis of the aluminum salt. An alkaline compound constituting the alkaline aqueous solution can be at least one selected from sodium hydroxide, potassium hydroxide, calcium hydroxide, barium hydroxide, and the like. Sodium hydroxide is particularly preferred.

Water insoluble salt as a by-product in the reaction mixture is properly removed.

Preferably, an amount of the alkaline compound is two to four times the amount of aluminum salt in molar ratio. In other words, a ratio of a concentration of the aqueous solution with the aluminum salt and a concentration of the alkali aqueous solution is 1/4 to 1/2 in molar ratio. The alkaline compound less than two times is insufficient to produce a reaction product by performing a heat treatment. Moreover, in some cases, gelation of the reaction solution is not caused, and the particles cannot be obtained with a good yield. On the contrary, when the amount of the alkaline compound is more than four times that of the aluminum salt, the pH of the reaction mixture is too high, and the alkali dissolves the gel, thus increasing adhering and aggregating particles in some cases.

Preferably, the concentration of the aluminum salt aqueous solution is within a range from 0.1 to 0.3 M, and the concentration of the alkaline aqueous solution is within a range from 4.0 to 10.0 M. This can facilitate formation of the gel material in the reaction mixture of the aluminum salt aqueous solution and the alkaline aqueous solution. The concentration of the metallic salt in the aluminum salt aqueous solution is, as described above, preferably, 1.0 to 3.0 M and is more preferably 3.0 M in terms of the productivity.

Furthermore, in the present invention, the form of the desired boehmite particles can be controlled by changing the pH of the reaction mixture. For example, the closer the pH is to 4, the longer the long axis of the aluminum particles 1 is, and the higher the aspect ratio thereof is. On the contrary, the closer the pH is to 9, the shorter the long axis of the aluminum particles 1 is, and the lower the aspect ratio thereof is. When the pH is less than 4 or more than 9, plate-shaped particles or amorphous particles increase in some cases.

The pH value of the reaction mixture can be controlled by changing the concentration and the volume of the alkaline aqueous solution.

On the other hand, it is preferable that the volume of the aluminum salt aqueous solution is equal to or larger than the alkaline aqueous solution. When the concentration of the alkaline aqueous solution is low and the volume thereof is too much, the gelation is less likely to occur. If the concentration of the aluminum salt aqueous solution and the volumes of the aluminum salt aqueous solution and alkali aqueous solution are fixed, the form of the particles can be controlled by only changing the concentration of the alkali aqueous solution. Accordingly, setting the volumes same is more preferable for reducing the number of items of the synthesis condition.

Through the above described process, the gel material can be formed in the reaction mixture. In the growth process of the boehmite particles by heat treatments as shown below, therefore, the boehmite particles in the growth process are stabilized in the gel material, and adherence and aggregation of the particles are suppressed. It is therefore possible to obtain nano-sized boehmite particles with the particle size distribution range narrowed.

<Heat Treatment>

In the present invention, after the aforementioned reaction mixture containing the gel material is produced, first to fourth heat treatments are sequentially carried out. The following heat treatments are carried out while the boehmite particles in the growth process are fixed in the gel material. Accordingly, the particle size distribution range can be extremely narrowed, or the standard deviation can be reduced. As described below, the particle size distribution range can be widened to some extent by properly changing conditions of the heat treatments.

The first heat treatment is carried out by heating the reaction mixture to a first temperature not less than the room temperature. The first heat treatment is mainly to promote hydrolysis of the alkali metal salt generated in the reaction mixture and promote formation of the gel material in the reaction mixture.

The first temperature may be within a range from a room temperature (25° C.) to 140° C., and preferably, 120 to 140° C. considering reaction time. If the first heat treatment is carried out at a temperature above 140° C., boehmite particles with different lengths are generated, and in some cases, the particle size distribution range of the boehmite particles cannot be narrowed even after the subsequent heat treatments are carried out. Preferably, the heat treatment time is 24 hours or more. In the case of less than 24 hours, the standard deviation of the particle size is difficult to reduce.

After the first heat treatment, the second heat treatment is carried out. In this second heat treatment, the reaction mixture is heated to a second temperature higher than the first temperature of the first heat treatment. The second heat treatment is carried out mainly to obtain boehmite particles with a high aspect ratio.

The second temperature needs to be higher than the first temperature and is specifically within a range from 140 to 250° C. In particular, 170 to 250° C. is preferred. When the temperature is lower than 140° C., it takes a long time to generate the particles, and as well as the particle size distribution range is widened. Moreover, temperature higher than 250° C. is advantageous in manufacturing particles with a small aspect ratio. However, temperature higher than 250° C. is not recommended in this manufacturing method because the heat and pressure resistances of an autoclave of a normal grade on the market have upper limits at 250° C. and a great amount of energy is required when the temperature is higher than 250° C.

The heat treatment time in the second heat treatment is preferably within a range from 10 to 30 minutes containing a temperature increasing step, and varies depending on the second temperature. Heating for more than the above time considerably increases the standard deviation of the average particle diameter and turns the needle-shaped particles and the plate-shaped particles into a spindle shape and a particle shape, respectively, reducing the aspect ratio.

After the second heat treatment, the third heat treatment is carried out. This third heat treatment is carried out at a third temperature lower than the second temperature in the second heat treatment. The third heat treatment is performed mainly to narrow the particle size distribution range of the boehmite particles.

The third temperature is set to, for example, 130° C. or lower and preferably, set to the room temperature or lower. It is preferable that the reaction mixture is set to the third temperature by rapid cooling from the second temperature in the second heat treatment. In this case, considering a cost of a cooler and resistance of a vessel to temperature variation, the third heat treatment can be performed by putting the vessel for the heat treatments into running water. Preferably, the time required for the cooling is shorter. Specifically, it is preferable that the time required for cooling is within 10 minutes. The third heat treatment time is preferably 10 minutes or more containing the time required for cooling. This can narrow the particle size distribution range of the desired boehmite particles.

After the third heat treatment, the fourth heat treatment is carried out. This fourth heat treatment is performed mainly to grow the boehmite particles with a high aspect ratio.

A fourth temperature of the fourth heat treatment needs to be set within a temperature range from 100 to 180° C. If the fourth temperature is higher than 180° C., the particle size distribution range increases, and the standard deviation increases. Moreover, needle-shaped and plate-shaped particles are turned into spindle and particle shapes, respectively, thus reducing the aspect ratio in some cases. To be specific, in the fourth heat treatment, if the heat treatment is performed at a temperature of 180° C. or more, the produced particles are remelted and recrystallized (Ostwald ripening), and the shape of the particles and the particle size distribution range cannot be controlled in some cases, which sometimes increases the particle size distribution range. When the fourth temperature is lower than 100° C., the yield is reduced in some cases. The treatment time is four hours to one week, and heating time varies depending on a temperature setting.

After the aforementioned heat treatment, the vessel accommodating the reaction product is allowed to cool, and then the produced boehmite particles and the solution are separated using a centrifugal separator. Thereafter, to remove salt as a by-product, the obtained boehmite particles are centrifuge washed three times with sodium nitrate aqueous solution (0.5 M), centrifuge washed once with water, and centrifuge washed once with water-methanol mixed solution (volume ratio: water/methanol=0.5/9.5), followed by drying to obtain the desired boehmite particles.

Through the above four step heat treatments, it is possible to obtain boehmite particles with a short axis length of 1 to 10 nm, a long axis length of 20 to 400 nm, and an aspect ratio of 50 to 80. Moreover, the standard deviations of the size property values can be suppressed within 10%. Accordingly, when the resin composition is manufactured by causing the boehmite particles to be contained in the predetermined resin, variation in the properties thereof can be reduced. It is therefore possible to produce goods with stable quality from the resin composition.

It is obvious that boehmite particles with different sizes can be manufactured. This can be achieved by carrying out the first heat treatment at a temperature of 140° C. or more for three hours or more and omitting the second to fourth heat treatments. In this case, the standard deviations of the size property values can be 20% or more.

<Baking Treatment>

Next, a description is given of a method of manufacturing α and γ alumina particles which are expressed by the aforementioned general Formula I when n is 0.

For manufacturing such alumina particles, after the production of the reaction mixture and the heat treatments in the aforementioned method of manufacturing boehmite particles, the obtained boehmite particles are subjected to a baking treatment. The baking treatment is performed, for example, at 450 to 1500° C. for 1 to 3 hours. For example, the boehmite particles obtained by the aforementioned method is put into an alumina crucible and then heated at 1000° C. for 4 hours, thus obtaining α alumina particles. At this time, to prevent the hollow structure characteristic to the aforementioned boehmite particles from being damaged by thermal stress, it is preferable that the temperature increase and decrease rates are 2° C./min. By observation of the α alumina powder with a transmission electron microscope, it is possible to confirm that each particle substantially maintains its form before the baking treatment and is a hollow needle-shaped particle.

Moreover, it is preferable to comminute the boehmite particles serving as a raw material by taking means such as freeze drying the boehmite dispersed into water, or spray drying the same. When the boehmite particles are dried in a heat oven or naturally dried, the particles are strongly fixed to one another, and the α alumina particles obtained later becomes incapable of being redispersed into the organic solvent or water. In the case of synthesizing the γ alumina particles, in a similar way to the above, it is recommended to use the boehmite particles as a starting material and to perform the sintering treatment at 550° C. to 800° C.

<Blending of Organic Acid Salt and Dispersion to Organic Solvent>

In manufacturing a resin composition to be described later, first, the alumina particle composite 1 is made of the alumina particles 2 obtained as described above, and subsequently, a dispersion liquid is prepared, in which the alumina particle composite is dispersed into the organic solvent or water.

A method of dispersing the alumina particle composite into the organic solvent is described. First, the alumina particles obtained as described above are forcibly dispersed into the organic solvent by using at least one means of an ultrasonic wave, a microbead mill, stirring, and high-pressure emulsion, and subsequently, the organic acid containing the predetermined sulfonic acid group, carboxyl group or hydroxyl group, or the boric acid, the phosphoric acid or the amino acid is added thereto. In such a way, the target alumina particle composite can be obtained, and simultaneously, the dispersion liquid in which the alumina particles are dispersed into the organic solvent can be obtained.

However, some type of the organic acid for use is not dissolved into the organic solvent and does not react with the alumina particles. Accordingly, in this case, it is necessary to disperse the alumina particles into water once. In the case of dispersing the alumina particles into water, the means such as the ultrasonic wave, the microbead mill, the stirring, and the high-pressure emulsion is used. When the organic acid salt is added to the obtained mixed liquid of water and the alumina, the target alumina particle composite can be obtained. Then, solvent exchange is performed from water to the organic solvent by performing centrifugal separation, distillation, and so on, thus making it possible to obtain the dispersion liquid.

The dispersion of the boehmite particles by the ultrasonic wave is performed by putting the boehmite particles and water into a predetermined ultrasonic dispersion apparatus and driving the apparatus concerned according to a usual procedure. The dispersion of the boehmite particles by the microbead mill is performed by putting the boehmite particles and water into a predetermined microbead mill dispersion apparatus and driving the apparatus concerned according to a usual procedure. Moreover, the dispersion of the boehmite particles by the high-pressure emulsion is performed by putting the boehmite particles and water into a predetermined high-pressure emulsion apparatus and driving the apparatus concerned according to a usual procedure.

Note that, specifically, the high-pressure emulsion refers to the following operation. The liquid containing the boehmite particles and the like is pressurized by a pump, passed through a narrow gap between a pulp sheet and a valve at a supersonic flow rate, and cavitation is thus generated at an edge portion of the pulp sheet. Then, a large pressure difference occurs locally following decay of cavities, and the aggregated particles in the liquid are torn off and redispersed into primary particles.

Moreover, the organic solvent is not particularly limited as long as it is capable of dissolving the resin to be manufactured and of uniformly mixing the dissolved resin composition and the alumina particle composite therein in the polymerization process later. Specifically, mentioned are tetrahydrofuran (THF), dichloromethane, 1,2-dichloroethane, chloroform, 1,1,2,2-tetrachloroethane, chlorobenzene, dichlorobenzene, methylethylketone, cyclohexanone, acetone and the like. These organic solvents may be used singly or as a mixture of two or more thereof. It is tetrahydrofuran and chloroform that are particularly preferable.

Moreover, in the case of preparing the liquid in which the alumina particle composite is dispersed into the organic solvent, it is preferable to blend water with the organic solvent. Specifically, a blended amount of water with 1 mol of the alumina particle composite is preferably 0.1 mmol or more in the organic solvent. In such a way, dispersibility of the alumina particles in the solvent can be improved.

Furthermore, it is preferable that a light transmittance of the dispersion liquid in which the alumina particles are dispersed be 40% or more. When the light transmittance is less than 40%, the dispersibility of the alumina particle composite is poor. In the polymerization process to be described below, the alumina particle composite contained in the dispersion liquid cannot be dispersed uniformly in the target resin composition, thus sometimes making impossible to achieve the original object of the present invention.

(Resin Composition)

The above-described alumina particle composite can be contained as the filler in a resin, and as a result, a predetermined resin composition can be obtained.

The blended amount of the alumina particle composite with the resin is not particularly limited as long as it allows required properties (rigidity, thermal resistance, thermal expansion resistance and the like) to be obtained. However, the blended amount is preferably within a range from 1 to 50% by weight, more preferably 1 to 30% by weight. When the blended amount of the alumina particle composite is less than 1% by weight, an effect of blending the alumina particle composite is small, and in some case, the improvements of the properties such as the thermal resistance and the thermal expansion resistance are hardly recognized. On the other hand, when the blended amount of the alumina particle composite exceeds 50% by weight, not only the increase of the specific gravity cannot be ignored but also a disadvantage occurs in terms of cost, causing a problem that the cost and specific gravity of the resin composition is increased. Moreover, when the content of the alumina particle composite is increased, the viscosity of the resin composition is increased, causing a deterioration of the moldability.

The resin made to contain the alumina particle composite can include polycarbonate resin, acrylic resin, methacrylic resin, polyester resin, styrene resin, amorphous olefin resin, and the like. In terms of the transparency, thermal resistance, and rigidity, thermoplastic resin such as polycarbonate, acrylic and methacrylic resins are preferable. It is a matter of course that the alumina particle composite is usable not for the purpose of improving the optical property but for the purpose of reinforcing the resin. In this case, the alumina particle composite can be contained in the thermoplastic resin and thermosetting resin.

As the thermoplastic resin, mentioned are polyolefin resin such as polyethylene resin, polypropylene resin and polybutylene resin, olefin modified resin such as maleic anhydride-modified polypropylene resin, polyester resin such as polyethylene terephthalate, polybutylene terephthalate and polytrimethylene terephthalate, styrene resin such as polystyrene, high impact polystyrene, AS resin (acrylonitrile-styrene resin), ABS resin (acrylonitrile-butadiene-styrene resin) and MBS resin (methylmethacrylate-butadiene-styrene resin), polyamide resin such as Nylon 6, Nylon 66 and Nylon 610, and further, polyoxymethylene, polyvinyl chloride, polycarbonate, polymethylene methacrylate, and thermoplastic polyimide.

As the thermosetting resin, epoxy resin, phenol resin, xylene resin, alkyd resin, polyimide, urea resin, melamine resin, polyurethane resin, and the like can be mentioned.

While the above-described resins can be used singly, the resins can be used by mixing two or more thereof. Preferably, in order to reinforce inexpensive resin, resin to be selected is at least one thermoplastic resin selected from the polyolefin resin, the polyamide resin, the polyester resin, and the polystyrene resin.

The resin composition formed of polycarbonate can be obtained by a melt-mixing method of adding the alumina particle composite to the melted resin by using a twin screw mixer, a polymerization method of adding the alumina particle composite in a process of synthesizing a polymer from resin monomers, a solution method of mixing a liquid having the alumina particle composite uniformly dispersed therein with a solution having the resin dissolved therein and distilling away a solvent, and the like. In the melt-mixing method, a solid of the alumina particle composite, a dispersion liquid thereof in water, or a dispersion liquid thereof in the organic solvent is used. For the mixer, a twin screw extruder, a vacuum micro mixer/extruder, a labo-plasto mill, and the like are usable, and the mixer is selected and decided depending on the type of alumina particles and the type of solvent in which the alumina particles are dispersed. In the polymerization method, the polycarbonate resin composition can be obtained by adding the alumina particles simultaneously with manufacturing of the polycarbonate resin by a so-called phosgene method, a so-called ester exchange method, or the like. The phosgene method is a condensation reaction of a phenol compound with two or more valences with phosgene, and the ester exchange method is an ester exchange reaction of carbonate diester and a hydroxyl compound. The phenol compound with two or more valences is preferably 2,2-bis(4-hydroxydiphenyl)propane (common name: bisphenol A), bis(4-hydroxyphenyl)methane, bis(4-hydroxyphenyl)phenylmethane, bis(3,5-dimethyl-4-hydroxyphenyl)ethane, 1-phenyl-1,1-bis(4-hydroxyphenyl)ethane, 2,2-bis(3,5-dimethyl-4-hydroxyphenyl)propane, 1,1-bis(4-hydroxyphenyl)-3,3,5-trymethylchclohexane, bis(4-hydroxyphenyl)sulfone, 4,4'-dihydroxybenzophenone, more preferably, 2,2-bis(4-hydroxyphenyl)propane, 1,1-bis(4-hydroxyphenyl)-3,3,5-trimethylcyclohexane. These divalent phenols and the like may be used singly or in combination of two or more thereof.

The carbonate diester compound includes a diaryl carbonate such as diphenylcarbonate, and a dialkyl carbonate such as dimethylcarbonate and diethylcarbonate. The hydroxy compound includes phenol, p-cresol, p-t-butylphenol, p-t-octylphenol, p-cumylphenol, bromophenol, tribromophenol, nonylphenol, and the like.

The phosgene is preferably used in the method for use in the phosgene method; however, it is possible to use other dihalogenated carbonyl, which does not inhibit the effect obtained by the present invention at all.

In the solution method, first, the polycarbonate is dissolved into the organic solvent having the alumina particle composite dispersed therein. Alternatively, the polycarbonate is dissolved into the organic solvent, and the alumina particle composite dispersed in the organic solvent is mixed with the solution of the polycarbonate. Subsequently, the mixed solution of the polycarbonate and the alumina particle composite is stirred well, followed by heating, thereby removing the solvent. In this case, pressure reduction and heating are performed to the maximum possible, thereby distilling away the solvent quickly. As the solvent is being reduced, the viscosity of the solvent is raised; however, the stirring of the solution is to be continued until the stirring becomes impossible. In such a way, the resin composition free from aggregation can be obtained uniformly. The organic solvent that can dissolve the polycarbonate well is recommended. For example, the organic solvent includes tetrahydrofuran, dichloromethane, 1,2-dichloroethane, chloroform, 1,1,2,2-tetrachloroethane, chlorobenzene, dichlorobenzene, methylethylketone, cyclohexanone, acetone, and the like.

The acrylic and methacrylic resin compositions in the thermoplastic resin can also be obtained by the melt-mixing method, the polymerization method, the solvent method and the like in a similar way to the polycarbonate resin composition.

As the methacrylic and acrylic resin monomers for use in the polymerization method, mentioned are (meth)acrylate esters such as methyl(meth)acrylate, ethyl(meth)acrylate, isopropyl(meth)acrylate, n-butyl(meth)acrylate, isobutyl(meth)acrylate, n-amyl(meth)acrylate, isoamyl(meth)acrylate, n-hexyl(meth)acrylate, 2-ethylhexyl(meth)acrylate, octyl(meth)acrylate, decyl(meth)acrylate, dodecyl(meth)acrylate), octadecyl(meth)acrylate, cyclohexyl(meth)acrylate, phenyl(meth)acrylate, benzyl(meth)acrylate. These monomers may be used singly or in combination of two or more thereof. In the light of the balance between the transparency, the rigidity, the hardness, and the like, it is preferable that methyl(meth)acrylate be a major component. More preferably, methyl(meth)acrylate is 70 mass % or more of the total amount of a monomer polymerizable with the aforementioned unsaturated monomer.

Description is made below in detail of the embodiment of the present invention by Examples and Comparative examples. The present invention is not limited to these examples. Analysis methods and analyzers employed in the present invention are as follows.

(1) Particle Shape and Length

Particle shapes were observed by a transmission electron microscope (TEM).

<Observation Method of Particle Shape>

Samples and pure water were mixed and then treated with an ultrasonic cleaner for 15 minutes. Thereafter, the samples were applied to a hydrophilic carbon-coated collodion film on a copper mesh, followed by drying, thereby preparing observation samples. Electron microscope images of the samples were photographed with a transmission electron microscope (120 kV, 70 mA, 100,000 magnification) and observed.

TEM copper mesh: Microgrid 150-B mesh, carbon-reinforced, Okenshoji Co., Ltd.

Transmission electron microscope: JEOL JEM-1200EXII, manufactured by JEOL Ltd.

<Observation Method of Particle Length>

The micrographs taken by the transmission electron microscope were scanned as electron data by a commercially available scanner, and the particle lengths were measured by using software to measure length on a commercially available personal computer. The short and long axis lengths and thickness were respectively measured for 100 pieces selected at random.

Software: Scion Image for Windows (registered trademark) manufactured by Scion corp.

(2) Particle Cross Section

Particle cross sections were measured by a transmission electron microscope (TEM).

<Observation Method of Particle Cross Section>

Solid alumina particles obtained by freeze drying were put into epoxy resin, thus embedding the particles in the resin. The cured resin was cut into thin sections with a thickness of about 60 to 100 nm by using an ultramicrotome at room temperature. Thereafter, the thin sections were attached to TEM grids, thereby preparing observation samples. Electron microscope images of the samples were photographed by a transmission electron microscope (300 kV, 400,000 magnification) and observed.

Epoxy resin: EPON812, Okenshoji Co., Ltd.
Ultramicrotome: FC—S type microtome, manufactured by REICHERT Inc.
Transmission electron microscope: H-9000, manufactured by Hitachi Ltd.

(3) Identification of Alumina

Observation was made by using a powder X-ray diffractometer.

<Observation Method>

The samples were pressed on non-reflecting plates for measurement, thereby preparing observation samples. The observation samples were measured by the X-ray diffractometer and compared with the JCPDS (Joint Committee on Powder Diffraction Standards) of alumina for identification.

X-ray diffractometer: RINT-2000, manufactured by Rigaku Corporation (4) Quantification of Organic Acid The samples were observed by using TG-DTA, IR, and NMR.

TG-DTA measurement apparatus: TG-DTA 320, manufactured by Seiko Instruments Inc.; Measurement temperature: room temperature to 900° C.; Temperature rise rate: 10° C./s
Nuclear magnetic resonance spectrometer: JNMLA-400, manufactured by JEOL Ltd.; Measured solvent: $CDCl_3$ (5) Measurement of Mechanical and Optical Properties The obtained resin compositions were dried and granulated, followed by hot pressing, thereby obtaining sample films with a thickness of 2 mm. The obtained sheets were measured in terms of the light transmittance, bending strength, flexural modulus, and linear expansion coefficient. The light transmittance was measured by a haze meter (HM-65, manufactured by Murakami Color Research Laboratory). The bending strength and flexural modulus were measured by an autograph (DSC-10T, manufactured by Shimadzu Corporation). The linear expansion coefficient was measured by a thermomechanical analyzer (TMA120C, manufactured by Seiko Instruments Inc.).

(6) Preparation of Alumina Particle-Dispersion Liquid (Examples 1 to 4)

EXAMPLE 1

Aluminum chloride hexahydrate (2.0 M, 20 ml, 25° C.) was put into a Teflon beaker provided with a mechanical stirrer, and then sodium hydroxide (5.10 M, 20 ml, 25° C.) was dropped into the same for about 6 minutes while being stirred (700 rpm). After the end of the dropping, the mixture was further continued to be stirred for 10 minutes, and after the end of stirring, the pH of the solution was measured (pH=7.18). Subsequently, the solution was separated 10 ml by 10 ml into autoclaves provided with Teflon liners, and then left at 120° C. in an oven for 24 hours (first heat treatment). The autoclaves were then moved to an oil bath and heated at 180° C. for 20 minutes (second heat treatment). Thereafter, the autoclaves were put into running water within 40 seconds, and were rapidly cooled to about 10° C. (third heat treatment). The third heat treatment was continued for 1 hour.

Subsequently, the autoclaves were put into the oven again and continued to be heated at 140° C. for 1 week (fourth heat treatment), and were then cooled with running water. After a supernatant of the solution in each autoclave was removed by centrifugation (18000 rpm, 30 min), the obtained product was centrifuge washed three times with a sodium nitrate aqueous solution (0.5 M), centrifuge washed once with water, and centrifuge washed three times with a water-methanol mixed solution (volume ratio: water/methanol=0.5/9.5), followed by drying by using a freeze dryer, thereby obtaining colorless crystal. As a result of X-ray diffraction, the obtained crystal was confirmed to be boehmite.

Examination of the size of the obtained boehmite particles revealed that the obtained crystal had a needle shape with a long axis length of 115±10 nm, a short axis length of 4.6±0.6 nm, and an aspect ratio of about 20 to 30. FIG. 3 is the exterior electron microscope photograph of the boehmite particles. The observed cross section along the short axis was hollow. This state is shown on a TEM photograph of a cross section in FIG. 4.

The above-described operations were repeated a few times, thereby obtaining 3.32 g of the boehmite particles. Thereafter, the particles were put into about 100 g of water and stirred, and ultrasonic dispersion was carried out for 20 minutes by the ultrasonic dispersion apparatus. Thereafter, an obtained aqueous solution containing the boehmite particles was put into a high-pressure emulsifier, and was treated with a pressure of 50 MPa. The light transmittance measured at this time was 20%.

Subsequently, after the end of the high-pressure emulsion treatment, 3.32 g of paratoluenesulfonic acid monohydrate was put into the solution and stirred well, and then the ultrasonic dispersion was carried out for 20 minutes by the ultrasonic dispersion apparatus. Thereafter, the aqueous solution was put into the centrifugal separator, and the centrifugation was performed therefor at 18000 rpm for 30 minutes. A supernatant was removed, and a precipitate was air-dried at room temperature. Subsequently, powder obtained by drying was dissolved into THF, and further, a proper amount of water was added by using a burette. For the solution thus obtained, the ultrasonic dispersion was performed for 30 minutes by the ultrasonic dispersion apparatus, and a pressure treatment of 50 MPa was performed by the high-pressure emulsifier. In such a way, a composite of the boehmite particles containing the organic acid, which were dispersed in THF substantially quantitatively, was able to be obtained.

Figure 5:
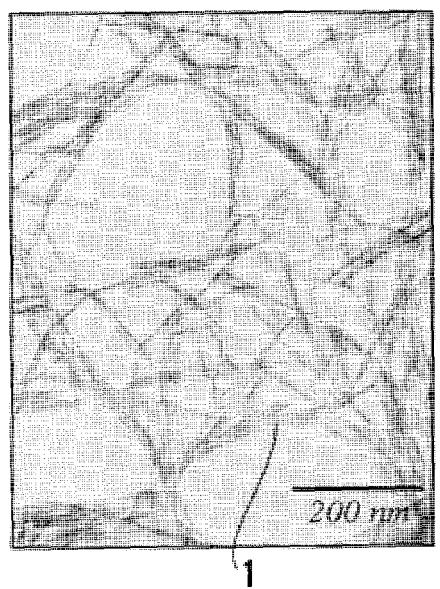
FIG. 5 is an electron microscope photograph of a dispersion liquid of boehmite particles manufactured by Example 1.

Note that the light transmittance of the dispersion liquid of the boehmite particles in THF was increased to 72%. Comparison of TEM images of the particles between a dispersed state into water and a dispersed state into THF revealed that the dispersion into THF relieved the aggregation more (FIG. 5). Moreover, the dispersion liquid was concentrated and dried, and an amount of the paratoluenesulfonic acid on the particles was confirmed by using the TG-DTA. Then, 12 mmol of the paratoluenesulfonic acid was adhered with respect to 1 mol of the boehmite particles. Note that signals of the paratoluenesulfonic acid were able to be confirmed also by an IR measurement, a GC-MASS measurement and an NMR measurement.

EXAMPLE 2

Boehmite particles were obtained in a similar way to Example 1 except that the concentration of the sodium hydroxide was changed from 5.10 M to 4.80 M. The pH of the solution obtained in the manufacturing process was 4.54. The obtained boehmite particles were needle-like crystal with a long axis length of 350±37 nm, a short axis length of 5.5±0.5 nm, and an aspect ratio of about 45 to 80. The observed cross section along the short axis had a hollow structure.

Figure 6:
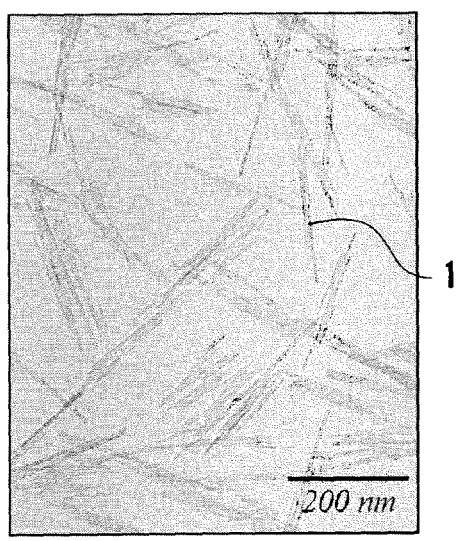
FIG. 6 is an electron microscope photograph of a dispersion liquid of boehmite particles manufactured by Example 2.

Subsequently, the ultrasonic treatment and the high-pressure emulsion treatment which were similar to those of Example 1 were carried out for the boehmite particles, thereby preparing a composite of the boehmite particles containing the paratoluenesulfonic acid. Subsequently, the ultrasonic treatment and the high-pressure emulsion treatment which were similar to those of Example 1 were carried out, thereby preparing a dispersion liquid of the boehmite particles into THF. Note that a light transmittance of an aqueous solution containing the composite was 12%, and a light transmittance of the dispersion liquid was 65%. Moreover, comparison of TEM images of the particles between a dispersed state into water and a dispersed state into THF revealed that the dispersion into THF relieved the aggregation more (FIG. 6).

Moreover, the dispersion liquid was concentrated and dried, and an amount of the paratoluenesulfonic acid on the particles was confirmed by using the TG-DTA. Then, 12 mmol of the paratoluenesulfonic acid was adhered with respect to 1 mol of the boehmite particles. Note that the signals of the paratoluenesulfonic acid were able to be confirmed also by the IR measurement, the GC-MASS measurement and the NMR measurement.

EXAMPLE 3

A colorless solid of the boehmite particles obtained by the method of Example 1 was put into an alumina crucible and heated at 1000° C. for 4 hours, thereby obtaining white powder. At this time, to prevent the hollow structure characteristic to the aforementioned boehmite particles from being broken by thermal stress, the temperature increase and decrease rate was set to 2° C./min.

Identifying the crystal phase of the white powder by using X-ray diffraction revealed that the powder was α alumina. As a result of examining reduction in weight of the powder during the heat treatment, the yield of this reaction was substantially 100%. Moreover, as a result of the TEM observation of the powder after the heat treatment, it was revealed that the particles substantially maintained their forms as they were before the heat treatment and were hollow needle-like particles. Furthermore, examination of the size of the powder revealed that the powder was needle-like crystals with a long axis length of 110±10 nm, a short axis length of 4.7±0.5 nm, and an aspect ratio of about 20 to 30.

Subsequently, 3.00 g of the powder (α alumina particles) was put into about 100 g of water and stirred well, and then the ultrasonic dispersion was carried out for 20 minutes by the ultrasonic dispersion apparatus. Thereafter, the aqueous solution containing the α alumina particles was put into the high-pressure emulsifier, and treated with the pressure of 50 MPa. The light transmittance measured at this time was 18%.

Subsequently, after the end of the high-pressure emulsion treatment, 5.98 g of the paratoluenesulfonic acid monohydrate was put into the dispersion liquid and stirred well, and then the ultrasonic dispersion was carried out for 20 minutes by the ultrasonic dispersion apparatus. Thereafter, the aqueous solution was put into the centrifugal separator, and the centrifugation was performed therefor at 18000 rpm for 30 minutes. A supernatant was removed, and a precipitate was air-dried at room temperature. Subsequently, powder obtained by drying was dissolved into THF, and further, a proper amount of water was added by using the burette. For the solution thus obtained, the ultrasonic dispersion was performed for 30 minutes by the ultrasonic dispersion apparatus, and a pressure treatment of 50 MPa was performed by the high-pressure emulsifier. In such a way, a composite of the α alumina particles containing the organic acid, which were dispersed in THF substantially quantitatively, was able to be obtained. Note that the light transmittance of the dispersion liquid of the α alumina particles in THF was increased to 65%.

Moreover, the dispersion liquid was concentrated and dried, and an amount of the paratoluenesulfonic acid on the particles was confirmed by using the TG-DTA. Then, 6 mmol of the paratoluenesulfonic acid was adhered with respect to 1 mol of the α alumina particles. Note that the signals of the paratoluenesulfonic acid were able to be confirmed also by the IR measurement, the GC-MASS measurement and the NMR measurement.

EXAMPLE 4

A colorless solid of the boehmite particles obtained by the method of Example 2 was put into the alumina crucible and heated at 1000° C. for 4 hours (sintering treatment), thereby obtaining white powder. At this time, to prevent the hollow structure characteristic to the aforementioned boehmite particles from being broken by thermal stress, the temperature increase and decrease rate was set to 2° C./min.

Identifying the crystal phase of the white powder by using the X-ray diffraction revealed that the powder was α alumina. As a result of examining reduction in weight of the powder during the heat treatment, the yield of this reaction was substantially 100%. Moreover, as a result of the TEM observation of the powder after the heat treatment, it was revealed that the particles substantially maintained their forms as they were before the heat treatment and were hollow needle-like particles. Furthermore, examination of the size of the powder revealed that the powder was needle-like crystals with a long axis length of 353±33 nm, a short axis length of 5.4±0.6 nm, and an aspect ratio of about 45 to 80.

Subsequently, 3.13 g of the powder (α alumina particles) was put into about 100 g of water and stirred well, and then the ultrasonic dispersion was carried out for 20 minutes by the ultrasonic dispersion apparatus. Thereafter, the aqueous solution containing the α alumina particles was put into the high-pressure emulsifier, and treated with the pressure of 50 MPa. The light transmittance measured at this time was 16%.

Subsequently, after the end of the high-pressure emulsion treatment, 6.02 g of the paratoluenesulfonic acid monohydrate was put into the dispersion liquid and stirred well, and then the ultrasonic dispersion was carried out for 20 minutes by the ultrasonic dispersion apparatus. Thereafter, the aqueous solution was put into the centrifugal separator, and the centrifugation was performed therefor at 18000 rpm for 30 minutes. A supernatant was removed, and a precipitate was air-dried at room temperature. Subsequently, powder obtained by drying was dissolved into THF, and further, a proper amount of water was added by using the burette. For the solution thus obtained, the ultrasonic dispersion was performed for 30 minutes by the ultrasonic dispersion apparatus, and a pressure treatment of 50 MPa was performed by the high-pressure emulsifier. In such a way, a composite of the α alumina particles containing the organic acid, which were dispersed in THF substantially quantitatively, was able to be obtained. Note that the light transmittance of the dispersion liquid of the α alumina particles in THF was increased to 58%.

Moreover, the dispersion liquid was concentrated and dried, and an amount of the paratoluenesulfonic acid on the particles was confirmed by using the TG-DTA. Then, 6 mmol of the paratoluenesulfonic acid was adhered with respect to 1 mol of the α alumina particles. Note that the signals of the paratoluenesulfonic acid were able to be confirmed also by the IR measurement.

EXAMPLE 5

3.02 g of boehmite particles obtained in a similar method to that of Example 1 was put into about 60 g of THF, and the boehmite particles were uniformly dispersed into THF while using an ultrasonic cleaner and a stirrer. Although the liquid was suspended at this time, 1.5 g of phenylboric acid was added thereto while being stirred well without taking care of the suspension. After being stirred well, the ultrasonic dispersion was carried out for 20 minutes by the ultrasonic dispersion apparatus. Thereafter, the liquid was put into the centrifugal separator, and the centrifugation was performed therefor at 18000 rpm for 30 minutes. A supernatant was removed, and about 60 g of THF was added to the liquid. For the liquid thus mixed, the ultrasonic dispersion was performed for 30 minutes by the ultrasonic dispersion apparatus, and the pressure treatment of 50 MPa was performed by the high-pressure emulsifier. In such a way, a composite of the boehmite particles containing phenylboric acid, which were dispersed in THF substantially quantitatively, was able to be obtained. The light transmittance of the liquid became 45%.

EXAMPLE 6

A proper amount of ethyl acetate was put into 100 g (solid concentration of boehmite: 4.5% by weight) of the dispersion liquid of the boehmite particles containing the paratoluenesulfonic acid in THF, which was obtained by the method of Example 1. Subsequently, a mixture thus obtained was put into the centrifugal separator, and the centrifugation was performed therefor at 18000 rpm for 30 minutes. A supernatant was removed, and about 100 g of THF and 2.3 g of phenylboric acid were added to the liquid. For the liquid thus mixed, the ultrasonic dispersion was performed for 30 minutes by the ultrasonic dispersion apparatus, and the pressure treatment of 50 MPa was performed by the high-pressure emulsifier. In such a way, a composite of the boehmite particles containing phenylboric acid, which were dispersed in THF substantially quantitatively, was able to be obtained. The light transmittance of the liquid became 40%.

EXAMPLE 7

To boehmite particles obtained in a similar way to that of Example 1, n-dodecylbenzenesulfonic acid was added in place of the paratoluenesulfonic acid. In such a way, a composite of the boehmite particles dispersed in THF was obtained. The light transmittance of the liquid became 65%.
(7) Manufacturing of Polycarbonate Resin Composition (Examples 8 to 14, Comparative Examples 1 to 4)

EXAMPLE 8

In a reaction vessel provided with a decompressor, a mechanical stirrer, and a reflux unit, 262 g (concentration: 4.39% by weight) of the boehmite particle-dispersion liquid obtained in Example 1, 50.4 g (221 mmol) of bisphenol A, 49.6 g (232 mmol) of diphenylcarbonate, and a proper amount of THF as a solvent were added and stirred for 1 hour. The system was gradually depressurized by using a pressure reduction line, thereby distilling away THF. Thereafter, the temperature was further increased, and the obtained product was preheated at about 160° C. for 20 minutes, thereby initiating a condensation reaction of the diarylcarbonate compound and bisphenol. Subsequently, the temperature of the reaction system was increased to 230° C. over 30 minutes. At this temperature, the condensation was advanced for about 160 minutes at a reduced pressure of 15 mmHg or less while the mixture was being stirred.

Subsequently, the temperature of the reaction system was increased to 260° C. over 30 minutes. At this temperature, the mixture was stirred for about 30 minutes at a reduced pressure of 10 mmHg or less, thus reducing an oligomer component unreacted. Finally, the mixture was ripened for 20 minutes in a range of 260° C. to 290° C. with the reduced pressure maintained, thereby obtaining a polycarbonate resin composition.

Figure 7:
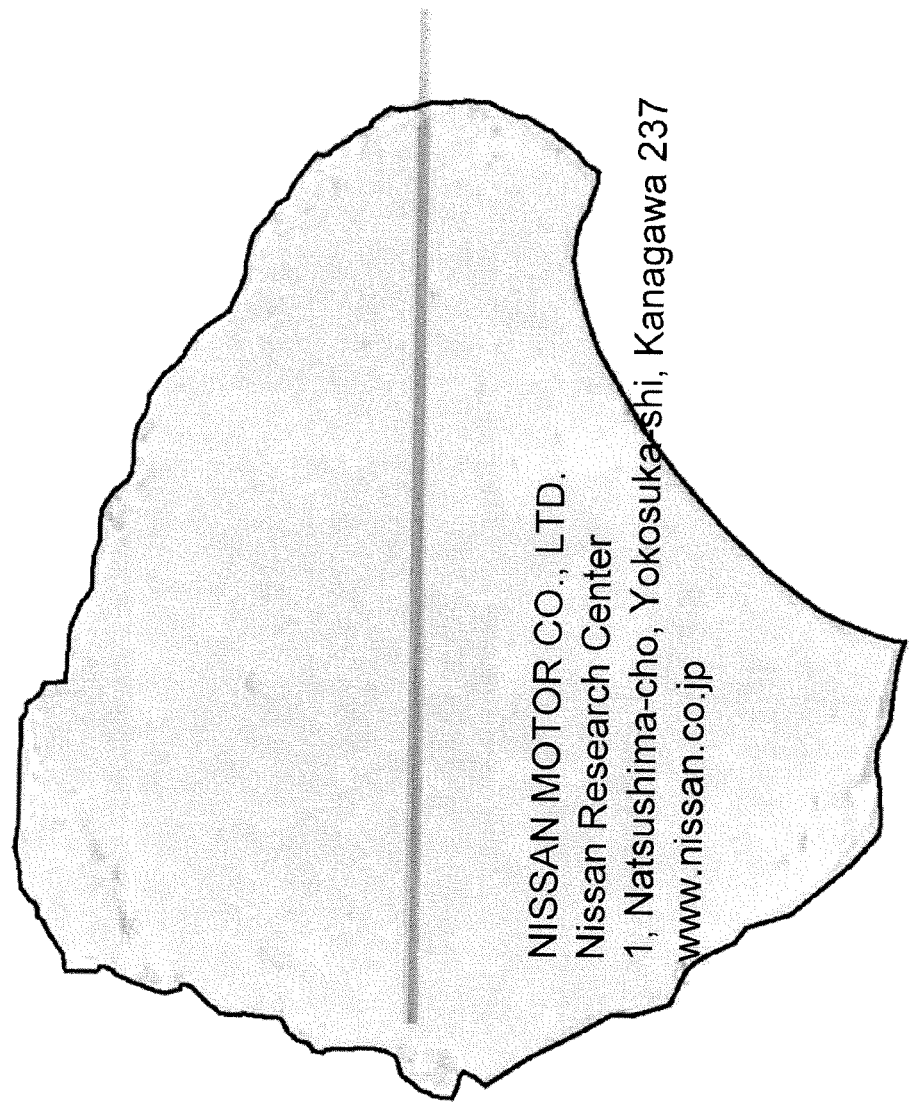
FIG. 7 is an exterior photograph of a transparent resin piece obtained by Example 5.

The obtained resin composition was dried and granulated, followed by hot pressing at 160° C., thereby obtaining a 2 mm thick plate. The properties of the obtained sample plate was examined, and the light transmittance was 82%; the bending strength, 120 MPa; the flexural modulus, 4.5 GPa; the linear expansion coefficient, $5.8 \times 10^{-5}/°$ C.; and the amount of particles blended, 8.7% by weight. These property values are shown in FIG. 8, and an exterior appearance of the obtained transparent resin piece is shown in FIG. 7.

EXAMPLES 9 to 14

The boehmite particle-dispersion liquid obtained in Example 2, the α alumina particle-dispersion liquids obtained in Examples 3 and 4, and the boehmite particle-dispersion liquids obtained in Examples 5 to 7 were used in place of the boehmite particle-dispersion liquid obtained in Example 1, thereby obtaining polycarbonate resin compositions in a similar procedure to that of Example 8. These polycarbonate resin compositions were dried and granulated, followed by the hot pressing at 160° C., thereby obtaining plates with a thickness of 2 mm. The obtained plates were measured in terms of the light transmittance and the bending strength in a similar way to Example 1. Results are shown in FIG. 8.

COMPARATIVE EXAMPLE 1

In the reaction vessel provided with the decompressor, the mechanical stirrer, and the reflux unit, 11.8 g of powder of Alumina sol 520 made by Nissan Chemical Industries, Ltd., 50.2 g (221 mmol) of bisphenol A, 49.6 g (232 mmol) of diphenylcarbonate, and a proper amount of THF as a solvent were added and stirred for 1 hour. The system was gradually depressurized by using the pressure reduction line, thereby distilling away THF as the solvent. Thereafter, the temperature was further increased, and the obtained product was preheated at about 160° C. for 20 minutes, thereby initiating a condensation reaction of the diarylcarbonate compound and bisphenol.

Note that, though Alumina sol 520 is commercially available as a dispersion liquid into water with a concentration of 20% by weight, Alumina sol 520 was used here as a dried solid by performing freeze drying therefor. Moreover, the particles have a boehmite structure and are stick-like or particle-like mixture with a particle diameter of 10 to 20 nm.

Subsequently, the temperature of the reaction system was increased to 230° C. over 30 minutes. At this temperature, the condensation was advanced for about 150 minutes at a reduced pressure of 5 mmHg or less while the mixture was being stirred. Furthermore, the temperature of the reaction system was increased to 260° C. over 30 minutes. At this temperature, the mixture was stirred for about 30 minutes at a reduced pressure of 10 mmHg or less, thus reducing the oligomer component unreacted. Finally, the mixture was ripened for 20 minutes in a range of 260° C. to 290° C. with the reduced pressure maintained, thereby obtaining a polycarbonate resin composition. The obtained resin composition was dried and granulated, followed by the hot pressing, thereby obtaining a plate with a thickness of 2 mm. The properties of the obtained sample plate were examined, and the light transmittance was 0%; the bending strength, 104 MPa; the flexural modulus, 3.3 GPa; the linear expansion coefficient, $6.3 \times 10^{-5}/°$ C.; and the amount of particles blended, 9.4% by weight. Results are shown in FIG. 9.

COMPARATIVE EXAMPLES 2 to 4

Polycarbonate resins were manufactured in a similar way to Comparative Example 1 except that Aluminum oxide C made by Nippon Aerosil Co., Ltd., alumina particles CAM 9010 made by Saint-Gobain Ceramic Materials K.K., and silica particles SNOWTEX MEK-ST made by Nissan Chemical Industries, Ltd. were used in place of Alumina sol 520 made by Nissan Chemical Industries, Ltd. Sample plates were made from these polycarbonate resins in a similar way to Comparative Example 1, and light transmittances thereof and the like were examined. Results are shown in FIG. 9.

Note that Aluminum oxide C made by Nippon Aerosil Co., Ltd. has a spherical shape with a diameter of about 13 nm. Moreover, alumina particles CAM9010 made by Saint-Gobain Ceramic Material K.K. have a rugby ball-like shape with a long axis length of about 90 nm and a short axis length of 10 to 15 nm. The particles do not exist singly, but four or five particles are linked together. Furthermore, SNOWTEX MEK-ST made by Nissan Chemical Industries, Ltd. had a concentration of alumina at 30% by weight and was commercially available with alumina dispersed in methylethylketone. SNOWTEX MEK-ST was dried by spray drying and used as a solid. The particle diameter was about 10 to 20 nm.

(8) Manufacturing of Acrylic Resin Composition (Examples 15 to 20, Comparative Examples 5 to 8)

EXAMPLE 15

78 g of methyl methacrylate, 25 g of acrylic acid, and a proper amount of THF as a solvent were put into a flask in an inert gas stream, and 0.5 mol % of azobisisobutyronitrile (AIBN) as a polymerization initiator was added thereto. While the mixture was being heated to 80° C. and stirred, 258 g of the boehmite particle-dispersion liquid (concentration: 4.39% by weight) obtained in Example 1 was added thereto, and an obtained mixture was maintained at 80° C. as it was for 24 hours while being stirred. After the end of the reaction, the obtained product was returned to the room temperature and then added with excessive n-hexane, thereby precipitating a polymer, and then the polymer was filtered. In such a way, a methacrylate resin composition was obtained. The obtained resin composition was dried and granulated, followed by the hot pressing, thereby obtaining a 2 mm thick plate. The properties of the obtained plate were examined, and the light transmittance was 84%; the bending strength, 118 MPa; the flexural modulus, 4.3 GPa; the linear expansion coefficient, $5.5 \times 10^{-5}/°$ C.; and the amount of particles blended, 9.2% by weight. These property values are shown in FIG. 8.

EXAMPLES 16 to 20

The boehmite particle-dispersion liquid obtained in Example 2 and the α alumina particle-dispersion liquids obtained in Examples 3 and 4 were used in place of the boehmite particle-dispersion liquid obtained in Example 1, thereby obtaining methacrylate resin compositions in a similar procedure to that of Example 15. These methacrylate resin compositions were dried and granulated, followed by the hot pressing, thereby obtaining plates with a thickness of 2 mm. The obtained plates were measured in terms of the light transmittance, the bending strength and the like in a similar way to Example 15. Results are shown in FIG. 8.

COMPARATIVE EXAMPLE 5

76 g of methyl methacrylate, 26 g of acrylic acid, and a proper amount of THF as a solvent were put into the flask in an inert gas stream, and 0.5 mol % of AIBN was added thereto. While the mixture was being heated to 80° C. and stirred, 10.0 g of powder of Alumina sol 620 made by Nissan Chemical Industries, Ltd. was added thereto, and an obtained mixture was maintained at 80° C. as it was for 24 hours while being stirred. After the end of the reaction, the obtained product was returned to the room temperature and then added with the excessive n-hexane, thereby precipitating a polymer, and then the polymer was filtered. In such a way, a methacrylate resin composition was obtained. The obtained resin composition was dried and granulated, followed by the hot pressing, thereby obtaining a 2 mm thick plate. The properties of the obtained plate were examined, and the light transmittance was 0%; the bending strength, 106 MPa; the flexural modulus, 3.8 GPa; the linear expansion coefficient, $5.8 \times 10^{-5}/°$ C.; and the amount of particles blended, 9.8% by weight. These property values are shown in FIG. 9.

COMPARATIVE EXAMPLES 6 to 8

Methacrylate resin compositions were manufactured in a similar way to Comparative Example 5 except that Aluminum oxide C made by Nippon Aerosil Co., Ltd., alumina particles CAM 9010 made by Saint-Gobain Ceramic Material K.K., and silica particles SNOWTEX MEK-ST made by Nissan Chemical Industries, Ltd. were used in place of Alumina sol 520 made by Nissan Chemical Industries, Ltd. Sample plates were made from these resin compositions in a similar way to Comparative Example 5, and light transmittances thereof and the like were examined. Results are shown in FIG. 9.

Note that, in FIG. 8, property values of polycarbonate resin that does not contain any filler are shown as Reference Example 1, and property values of methacrylate resin that does not contain any filler are shown as Reference Example 2.

As apparent from the results in FIGS. 8 and 9, the resin composition containing the alumina particle composite of the present invention was excellent in light transmittance, bending strength, and flexural modulus, which revealed that both the transparency and the mechanical strength were excellent. In addition, the linear expansion coefficient of the resin composition was also low, which revealed that thermal stability thereof was also excellent.

In Example 6, paratoluenesulfonic acid bonded to the surfaces of the alumina particles was substituted by phenylboric acid, thereby preparing the alumina particle composite in which phenylboric acid was chemically bonded to the surface. Although it is possible to prepare the alumina particle composite containing phenylboric acid also by the method as described in Example 5, it is also possible to prepare the alumina particle composite by the method of changing the substituent, which is as described in Example 6. In the case of preparing the alumina particle composite containing phenylboric acid by the method of Example 6, a liquid in which the dispersibility of alumina is higher can be obtained than in the case using the method of Example 5.

As above, the present invention has been described in detail with the specific examples. However, the present invention is not limited to the aforementioned contents, and various modifications and alterations can be made without departing from the scope of the present invention. For example, the resin composition of the present invention is, when necessary, can be added with an antioxidant, a thermal stabilizer, an ultraviolet absorber, a lubricant, a mold release agent, dyestuff, a colorant including pigment, an attachment agent of an additive, a nucleating agent, and the like singly or in proper combination. The oxidant and thermal stabilizer are hindered phenol, hydroquinone, thioether, phosphates, substitutions thereof, or the like. The ultraviolet absorber is resorcinol, salycylate, benzotriazole, benzophenone, and the like. The lubricant and mold release agent are silicone resin, montanic acid or salts thereof, stearic acid or salts thereof, stearyl alcohol, stearyl amide, or the like. The dyestuff is nitrosin or the like. The pigment is cadmium sulfide, phthalocyanine, or the like. The attachment agent is silicone oil or the like. The nucleating agent is talc, caolin, or the like.

The entire contents of Japanese Patent Applications No. P2004-259933 with a filing date of Sep. 7, 2004, No. P2004-361599 with a filing date of Dec. 14, 2004 and No. P2005-029168 with a filing date of Feb. 4, 2005 are herein incorporated by reference.

Although the invention has been described above by reference to certain embodiments of the invention, the invention is not limited to the embodiments described above will occur to these skilled in the art, in light of the teachings. The scope of the invention is defined with reference to the following claims.

What is claimed is:

1. A method of manufacturing a resin composition, the method comprising:
    manufacturing an alumina particle composite;
    dispersing the alumina particle composite into a first solvent to produce an alumina particle-dispersion liquid;
    mixing a monomer as a raw material of resin and the alumina particle-dispersion liquid; and
    polymerizing the monomer in a state where the monomer and the alumina particle-dispersion liquid are mixed together,
    wherein the step of manufacturing the alumina particle composite comprises:
        adding an alkali aqueous solution in an aqueous solution with an aluminum salt to produce a reaction mixture containing a gel material of aluminum hydroxide;
        first heating the reaction mixture at a first temperature not lower than room temperature;
        after the first heating, second heating the reaction mixture at a second temperature higher than the first temperature;
        after the second heating, third heating the reaction mixture at a third temperature lower than the second temperature; and
        after the third heating, fourth heating the reaction mixture at a fourth temperature not less than the room temperature; and
        dispersing boehmite particles generated in the reaction mixture into a second solvent, and adding an organic acid to the second solvent.

2. The method of manufacturing a resin composition according to claim 1, wherein the alumina particle-dispersion liquid is prepared by using an ultrasonic wave.

3. The method of manufacturing a resin composition according to claim 1, wherein a light transmittance of the alumina particle-dispersion liquid is 40% or more.

4. The method of manufacturing a resin composition according to claim 1, wherein the first solvent includes an organic solvent and water which is blended with the alumina particle composite in a ratio of 0.1 mmol or more to 1 mol.

5. The method of manufacturing a resin composition according to claim 1, wherein a ratio of a concentration of the aqueous solution with the aluminum salt and a concentration of the alkali aqueous solution is 1/4 to 1/2 in molar ratio.

6. The method of manufacturing a resin composition according to claim 1, wherein a concentration of the aqueous solution with the aluminum salt is within a range from 1.0 to 3.0 M, and a concentration of the alkali aqueous solution is within a range from 4.0 to 10.0 M.

7. The method of manufacturing a resin composition according to claim 1, wherein a form of the boehmite particle is changed by changing pH of the reaction mixture.

8. The method of manufacturing a resin composition according to claim 1, wherein the first temperature ranges from the room temperature to 140° C.

9. The method of manufacturing a resin composition according to claim 1, wherein the second temperature ranges from 140 to 250° C.

10. The method of manufacturing a resin composition according to claim 1, wherein the third temperature is not higher than 130° C.

11. The method of manufacturing a resin composition according to claim 1, wherein time taken for cooling from the second temperature to the third temperature is within 10 minutes.

12. The method of manufacturing a resin composition according to claim 1, wherein the fourth temperature ranges from 100 to 180° C.

13. The method of manufacturing a resin composition according to claim 1, further comprising:
    baking a boehmite particle obtained by the fourth heating.

* * * * *